(12) United States Patent
Keller et al.

(10) Patent No.: US 7,241,048 B2
(45) Date of Patent: Jul. 10, 2007

(54) LINEAR GUIDE DEVICE, CHAIN BODY, AND METHOD OF PRODUCING A CHAIN BODY

(75) Inventors: Werner Keller, Schwemmelsbach (DE); German Duetsch, Schweinfurt (DE); Roland Greubel, Ramsthal (DE)

(73) Assignee: Rexroth Star GmbH, Schweinfurt (DE)

( * ) Notice: Subject to any disclaimer, the term of this patent is extended or adjusted under 35 U.S.C. 154(b) by 533 days.

(21) Appl. No.: 10/638,759

(22) Filed: Aug. 11, 2003

(65) Prior Publication Data

US 2004/0071373 A1  Apr. 15, 2004

(30) Foreign Application Priority Data

Aug. 14, 2002 (DE) .............................. 102 37 278

(51) Int. Cl.
*F16C 29/06* (2006.01)
(52) U.S. Cl. .......................................... 384/43; 384/45
(58) Field of Classification Search ................ 384/43, 384/44, 45
See application file for complete search history.

(56) References Cited

U.S. PATENT DOCUMENTS

| 449,964 | A |  | 4/1891 | Simons |  |
|---|---|---|---|---|---|
| 2,566,421 | A |  | 9/1951 | Lapointe |  |
| 4,527,841 | A |  | 7/1985 | Teramachi |  |
| 4,531,788 | A |  | 7/1985 | Teramachi |  |
| 4,557,530 | A | * | 12/1985 | Haase | 384/45 |
| 4,637,739 | A |  | 1/1987 | Hattori |  |
| 4,869,600 | A |  | 9/1989 | Tonogai |  |
| 4,892,415 | A |  | 1/1990 | Katahira |  |
| 5,076,713 | A | * | 12/1991 | Morita | 384/45 |
| 5,829,883 | A |  | 11/1998 | Kawaguchi et al. |  |
| 5,993,064 | A |  | 11/1999 | Teramachi et al. |  |
| 6,042,269 | A |  | 3/2000 | Konomoto |  |
| 6,481,893 | B1 | * | 11/2002 | Greiner | 384/45 |
| 6,561,056 | B2 | * | 5/2003 | Maffeis | 74/490.01 |
| 6,652,146 | B2 | * | 11/2003 | Lee | 384/45 |

FOREIGN PATENT DOCUMENTS

DE  28 38 777  3/1980

(Continued)

*Primary Examiner*—William C. Joyce
(74) *Attorney, Agent, or Firm*—Michael J. Striker

(57) ABSTRACT

A linear guide device has a guide rail extending in a guiding direction, a guide carriage guided on the guide rail by at least one roll body revolving mechanism in the guiding direction. The at least one roll body revolving mechanism includes a revolving passage and a plurality of roll bodies which revolve in the revolving passage. The revolving passage has a running passage which is limited by a roll body running path formed on the guide rail and by a load-receiving wall portion of the guide car a return passage, and two deviating passages which connect the running passage with the return passage and in which the roll bodies are substantially load free. The guide carriage has a base unit and at least one revolving component group, the revolving component group having at least one lower wall portion of a wall which limits the return passage and at least one lower wall portion of a wall which limits the deviating passages. The revolving component group also has a load-receiving wall portion of the running passage, and holding mechanism which hold roll bodies arranged in a region of the running passage also on the guide carriage.

22 Claims, 6 Drawing Sheets

FOREIGN PATENT DOCUMENTS

| | | |
|---|---|---|
| DE | 101 23 875 A1 | 12/2001 |
| DE | 100 60 719 A1 | 6/2002 |
| EP | 1 055 834 A1 | 11/2000 |
| JP | 5-52215 | 3/1993 |
| JP | 6-147222 | 5/1994 |

\* cited by examiner

LINEAR GUIDE DEVICE, CHAIN BODY, AND METHOD OF PRODUCING A CHAIN BODY

BACKGROUND OF THE INVENTION

CROSS-REFERENCE

The invention described and claimed hereinbelow is also described in DE 102 37 278.0, filed Aug. 14, 2002. This German Patent Application, whose subject matter is incorporated here by reference, provides the basis for a claim of priority of invention under 35 U.S.C. 119 (a)-(d).

The present invention relates to a linear guide device with a guide rail extending in a guiding direction, and a guide carriage which is guided in the guiding direction on the guiding rail with at least one roll body revolving unit.

The at least one roll body revolving unit includes a revolving passage and a plurality of roller bodies which revolve in the revolving passage. The revolving passage includes a running passage which on the one hand is limited by a roll body running path formed on the guide rail and on the other hand is limited by a load-receiving wall portion of the guide carriage. A return passage and two deviating passages which connect the running passage with the return passage are further provided and the roller bodies are substantially load-free in the deviating passages. The guide carriage has a base unit and at least one revolving component group having at least one lower wall portion of the wall which limits the return passage and at least one lower wall portion of the wall which limits the deviating passages.

The above mentioned term "lower" and the term "upper" which will be used later on relates to an orientation of the guiding rail and the guiding carriage, in which both the longitudinal or guiding direction as well as the direction which extends orthogonal to the transverse direction of the guide rail and the guide carriage extends substantially in a vertical direction. This is the orientation in which the guide curvatures are assembled conventionally. It is to be understood that the guide carriages later, or in other words after the end of the assembly, either in a condition fitted on the guide rail or in a condition pulled out from the guide rail, can assume other orientations as well.

Such a linear guide device is disclosed for example in the Japanese patent document JP-8-6-147222. In this linear guide device the revolving component group includes a lower wall portion of the wall which limits the return passage and a lower wall portion of the walls which limit the deviating passages. On the guide of the roller bodies in the region of the both deviating passages, the revolving component group has however no part. In particular, the load receiving wall portions of the running passages are formed directly on the base unit of the guide carriage. After mounting of the guide carriage, in other words after the assembly of the base unit and the revolving component group, the running passage is still open, so that the roller bodies can be introduced into the deviating passage after the placement of the guide carriage on the guide rail. This complicates the mounting of the linear guide device quite significantly.

The structural principle, in accordance with which the load-receiving wall portion of the running passage is formed on the base unit of the guide carriage is disclosed also in a few other patents. They include from U.S. Pat. No. 5,993,064, European patent document EP 1 055 834 A1 and U.S. Pat. Nos. 4,637,739 and 4,869,600. In the last U.S. patent a part of the wall which limits the running passage is formed on the revolving component group. This wall portion surrounds the roll bodies however only over such a small part of its periphery that the roll bodies in this linear guide unit can be joined after the mounting of the guide carriage and the placement of the guide carriage on the guide rail, to form the total arrangement. All these patents have also the disadvantage of an expensive mounting of the whole linear guide device.

In the known linear guide device disclosed in U.S. Pat. No. 4,529,841 the roll bodies run around a special part, on which also the load-receiving surface of the running passage is formed. The wall portion of this special part which limits at least partially the return passage and the deviating passages however does not support the roll bodies. Moreover, no other steps are taken to hold the roll bodies on this special part.

Generally, roll body chains are known as holding means for the roll bodies. Japanese patent document JP-5-52215 discloses for example an open roll body chain, which can provide only a little hold for the roll bodies in an open running passage. In addition, the roll body receptacles of the chain body of this roll body chain are formed so that they holds the roll bodies along a peripheral circle. The known ball chain disclosed in U.S. Pat. No. 5,993,064 however provides a safe hold for the balls.

U.S. Pat. No. 449,964 discloses a rigid ball bearing-ball cage. It can not be utilized in linear guide devices because of its rigidity.

In order to be complete, also U.S. Pat. Nos. 4,531,788 and 5,829,883 must be mentioned as well.

SUMMARY OF THE INVENTION

Accordingly, it is an object of the present invention to provide a linear guide unit of the above mentioned general type, which can be assembled in a simple way.

This object in accordance with the present invention is achieved in a linear guide unit of the above mentioned type, in which the revolving component group further has a load-receiving wall portion of the running passage and in which holding means are provided, which holds the roll bodies arranged in the region of the running passage also in a condition of the guide carriage spaced from the guide rail, on the guide carriage.

Because of the lower wall portion of the return passage and the deviating passages, the revolving structural group in its assembled orientation cooperates with the guide carriage as a shell or a basket, in which for example the roller bodies can be introduced without problems, for example without the danger of falling out from the shell or the basket. The falling out from the running passage is moreover prevented on the one hand because the load-receiving wall portion of the running passage is formed on the revolving component group, and on the other hand by the holding means.

The revolving component group can be maintained as a premounted unit provided with the roll bodies, which significantly facilitates the mounting of the guide carriage. The fully mounted guide carriage provided with the roll bodies can be then fitted on the guide rail in a simple manner for end mounting of the linear guide device.

When the load-receiving wall portion of the running passage surrounds the roll bodies at most over their half periphery, it can be inserted in a simple manner into the running passage.

The holding means can be formed for example as an elongated holding bracket, whose longitudinal ends are mounted on the revolving component group in the region of the ends of the running passage, or can be formed of one piece with the same. For example, the holding bracket after insertion of the roll bodies in the running passage, can be arrested with its both longitudinal ends on the revolving component group.

In accordance with a second embodiment, it is however possible that the holding means is formed by a flexible, enclosed roll body chain. Endless, or in other words closed, roll body chains have the advantage that they hold the roll bodies especially secure on the revolving component group.

As a further embodiment it is also possible that the load-receiving wall portion of the running passage surrounds the roll bodies over more than half of their periphery and thereby itself forms the holding means.

Finally, it is not excluded that several above discussed variants can be used for forming the holding means in combination with one another.

It is further advantageous for manufacture and manufacturing costs when the revolving component group is formed for example of synthetic plastic, for example preferably injection molded. The load receiving wall portion of the running passage can be provided however on a steel element with a running trough.

In order to provide application of the forces acting on the roller bodies in the running passage as directly as possible to the base unit, it is further proposed that the element which has the load receiving wall portion of the running passage in the condition assembled with the base unit, supports the revolving component group on the base unit, preferably directly. For this purpose for example a projection can be formed on the base unit and can be inserted in an associated opening of the revolving component group. On this projection, the load-receiving wall portion, in particular the steel element, can abut in the mounting condition of the guide carriage. The recess, in which the projection is insertable, can be formed between a wall portion which limits the return passage and the part of the revolving component group which has the load-receiving wall portion, preferably the steel element.

In order to guarantee a secure hold of the revolving component group and the base unit, at least one arresting formation can be provided on the projection of the base unit. In the mounted condition it can engage with at least a part of the portion on the revolving component group which limits the recess.

For further facilitation of mounting of the guide carriage of the inventive linear guide device is proposed that an upper wall portion forms a deviating passage in an end cap unit, which is arranged in the longitudinal direction before or after the base unit of the guide wagon. The end cap unit can be composed for example of synthetic plastic, preferably injection molded. For a reliable connection of the revolving component group and the end cap unit, at least one pin can project from the revolving component group and plug onto the end cap unit. When the free end of the pin is deformable, the revolving component group and the end cap unit can be connected with one another to form a non releasable unit. Furthermore, at least one arresting element for example an arresting projection can be formed on the end cap unit. It is arrestable with an associated arresting counter element, for example an arresting opening, of the base unit or the revolving component group.

It is to be understood that the parts of the guide carriage can be connected with one another without using screw bolts for this purpose. By dispensing with the screw bolts, the mounting of the guide carriage is significantly facilitated.

The base unit can be made for example of light metal, preferably aluminum. Low manufacturing costs are achieved in particular when the base unit is composed of a cut extruded profile.

The present invention also deals with a closed, flexible chain body for a roll body chain with a plurality of roll body receptacles arranged after one another in a chain line for correspondingly at least one roll body. At least one roll body receptacle can be formed as a receptacle in a receiving cross-section of a receiving band, which corresponds to the contour of the associated roll body. It can be limited by two holding webs which extends substantially orthogonally to the chain line and two holding webs which run substantially in direction of the chain line. The limiting webs which extend substantially orthogonally to the chain line of the neighboring receiving portions are formed of one piece with one another. The limiting webs which run substantially in direction of the chain line are formed thicker in the region of their longitudinal centers.

The term "closed" chain body identifies such a chain body, in which each roll body receptacle is available via a preceding or a subsequent neighboring receptacle. The term "open" chain, such as for example disclosed in the Japanese patent document JP-A-5 52215 to the contrary identifies an end-standing receptacle at the beginning and at the end of the chain, which is available only over a single neighboring receptacle. Since the limiting webs running substantially in direction of the chain line are thickened in the region of their longitudinal centers which leads in the region of the roll body receptacles neighboring to the connecting line to the corresponding thinned formation of the limiting webs, the inventive chain body is available over a high range of the flexibility. This makes the deviating passage of the guide carriage especially noticeable in particular in the region of the deviating passages. Moreover, the thickened portions of the limiting webs provide a reliable hold of the roll bodies received in the roll body receptacles.

When at least one further limiting web which extends substantially in direction of the chain line is provided and surrounds the roll bodies received in the associated roll body receptacle outwardly of the plane of the receiving band, the roll bodies can be especially reliably held in the associated receptacles.

Finally, the present invention also deals with a method of producing a closed, flexible, chain body for a roll body chain with a plurality of roll body receptacles located one after the other in the direction of a chain line each for at least one roll body, wherein the chain bodies in reference to their use position are produced in a position turned substantially by 100° around the chain line, for example as an injection molded part, and later, in particular before the equipping with the roll bodies turned into its use position. The manufacture of the chain body in the position inverted around the chain line has the advantage that the plunger for forming the individual roll body receptacles can be applied from the radial outer side in a simple manner. This has enormous advantages for the construction and operation of the injection molded tools. The turning of the chain body to the operational or use position is possible due to the flexibility of the chain body.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
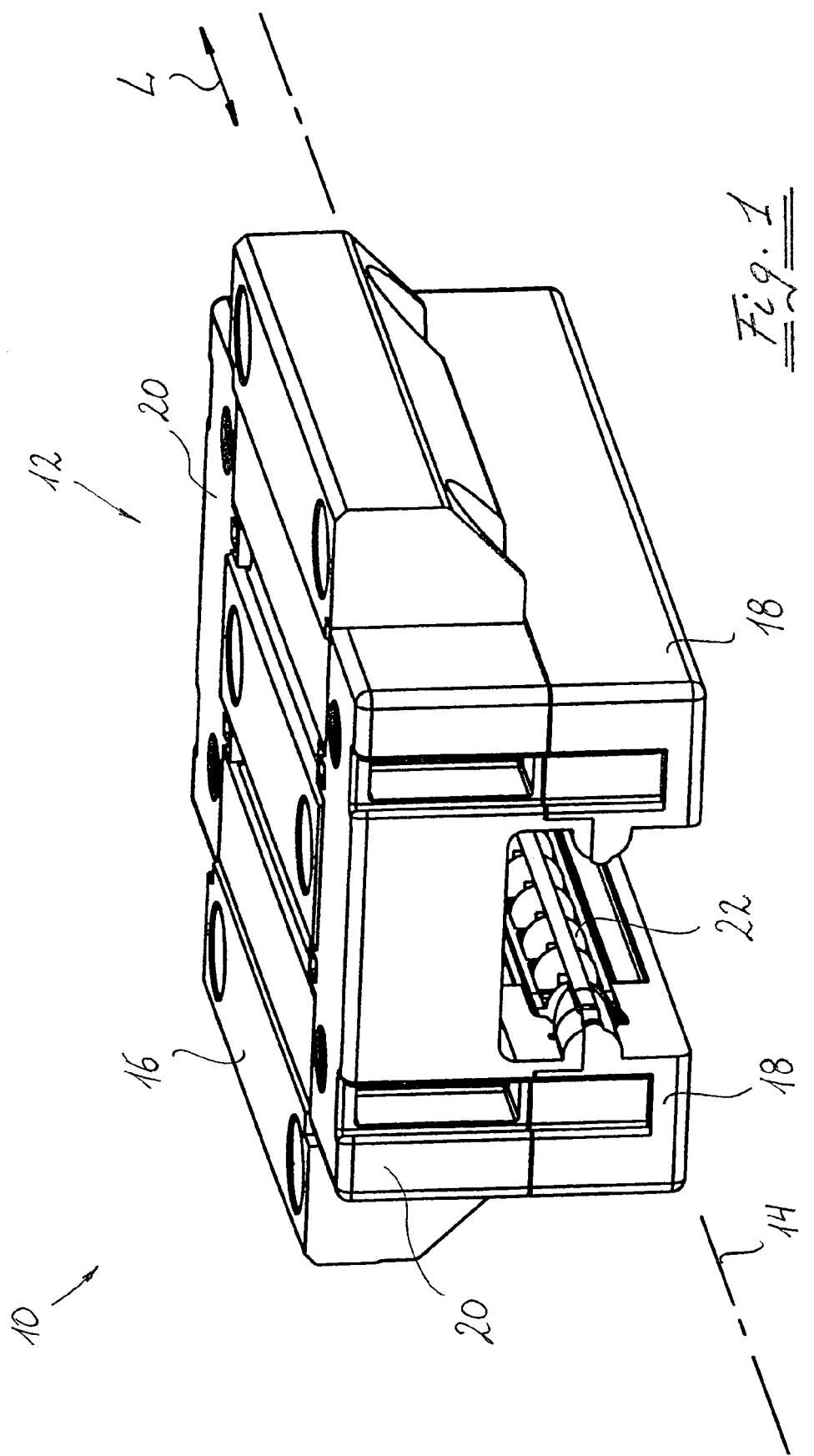
FIG. 1 is a perspective view of a guide carriage of a linear guide device in accordance with the present invention.

A linear guide device in accordance with the present invention is identified as a whole with reference numeral 10 in FIG. 1. It includes a guide carriage 12 which is displaceably guided in a known manner on a guide rail 14 identified with a broken line, in a longitudinal direction L.

The guide carriage 12 is assembled in accordance with the embodiment example of a plurality of structural groups, in particular it includes a base unit 16 on which tools or workpieces to be displaced for example along the guide rail 14 can be mounted, two revolving component groups 18 which construction will be explained later on, and two end cap units 20. The guide carriage 12 and in particular its revolving component groups 18 are formed in accordance with the present invention so that the revolving component groups 18 can be maintained as premounted units, in which roll bodies 22 are received for guiding the guide carriage 12 on the guide rail 14.

Figure 2:
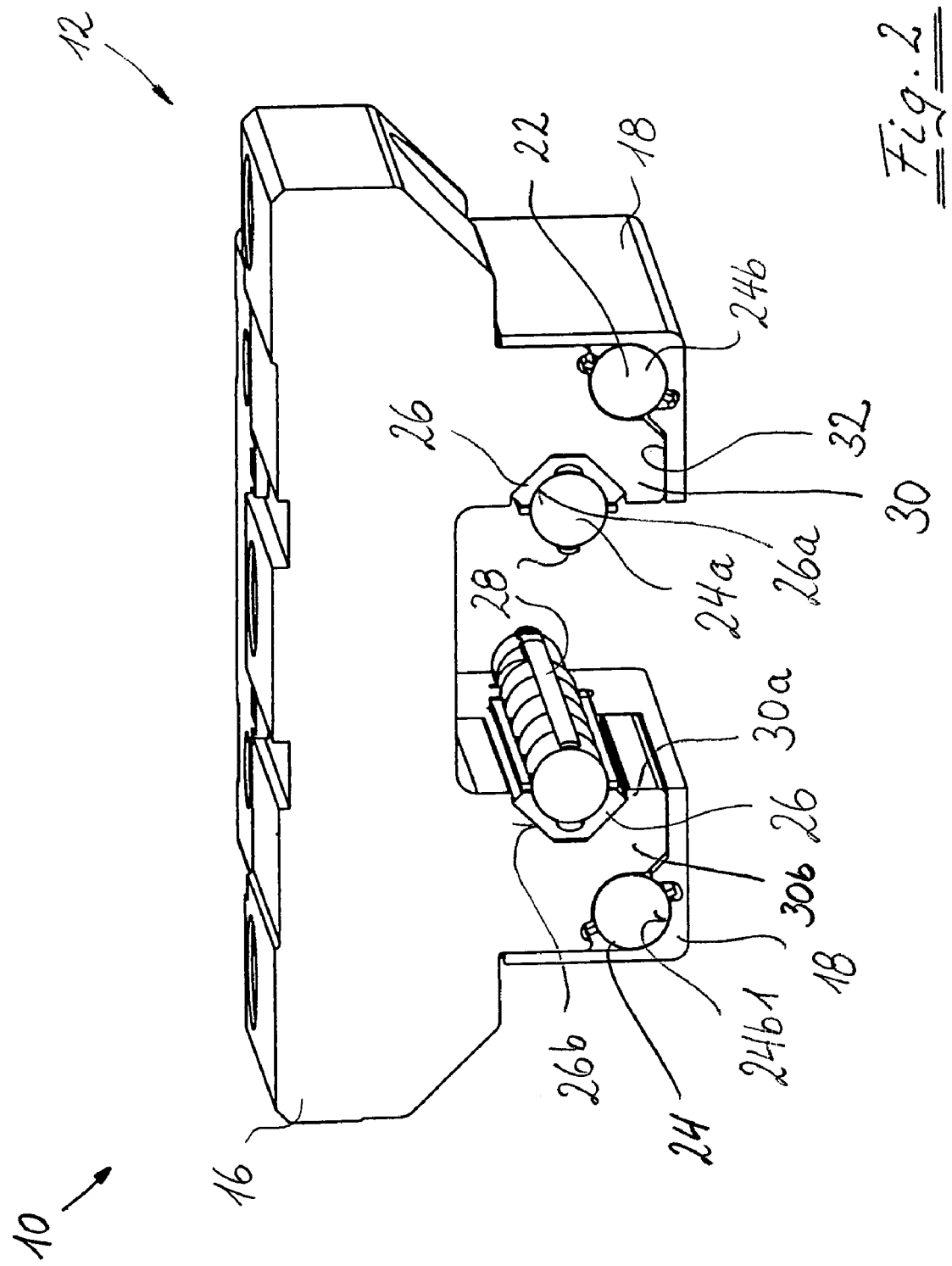
FIG. 2 is a perspective sectional view of the guide carriage of FIG. 1 in accordance with the present invention.
Figure 3:
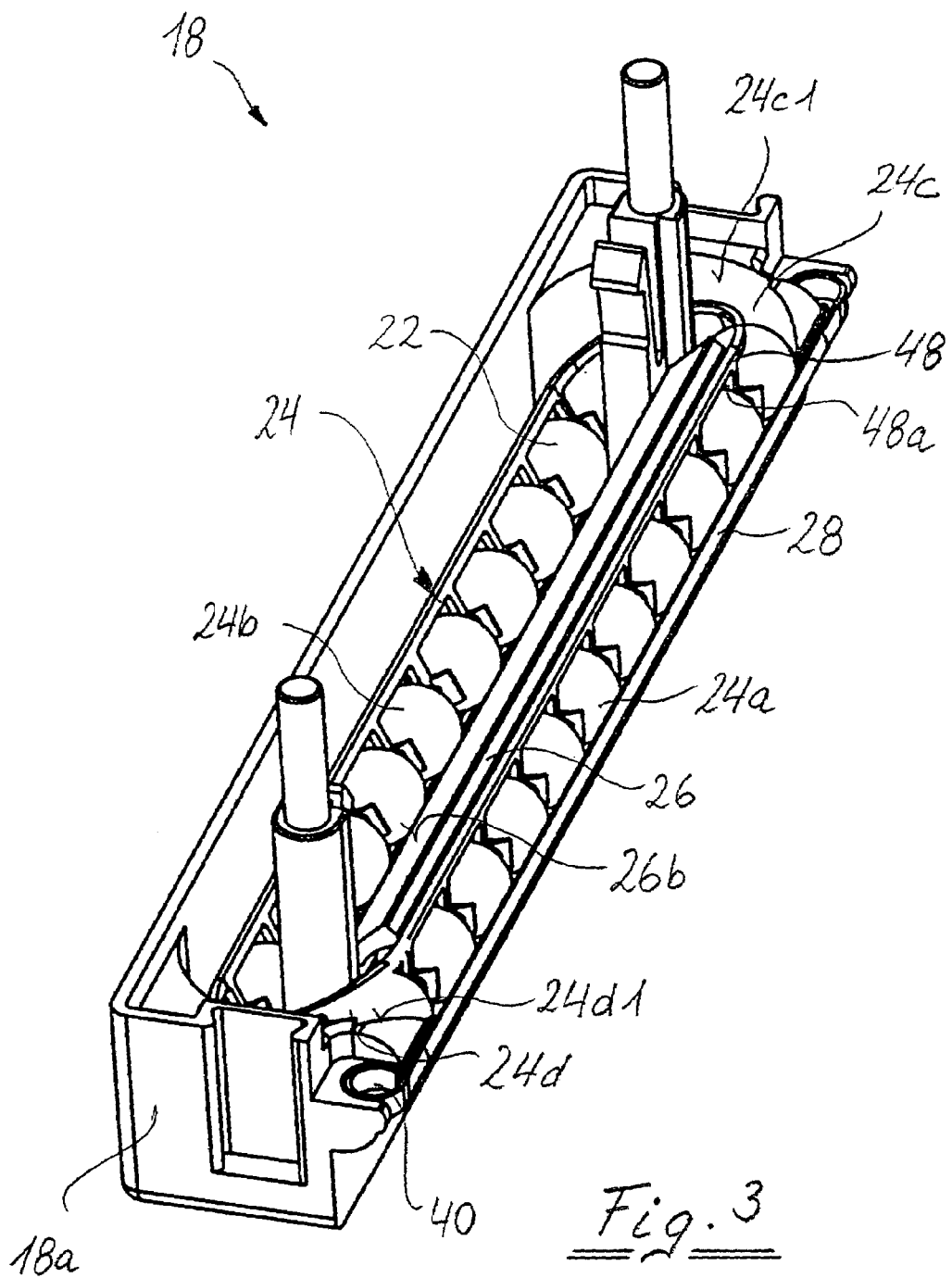
FIG. 3 is view showing a revolving component group of the guide carriage of FIG. 1, in accordance with the present invention.

The roll bodies 22 run in a roll body revolving passage 24 which is composed of a running passage 24a, a return passage 24b, and two deviating passages 24c and 24d shown in FIGS. 2 and 3.

The running passage 24a is formed between the guide carriage 12 and the guide rail 14. It is limited on the sides of the guide rail 14 by a running surface for the roll bodies 22 and on the sides of the guide carriage 12 by a load-receiving wall portion 26a of a trough-shaped element 26. The roll bodies 22 run in the return passage 24b load free, back to the beginning of the running passage 24a. The deviating passages 24c and 24d connect the running passage 24a and the return passage 24b on their both longitudinal ends.

As can be seen in particular in FIGS. 2 and 3, corresponding lower wall portions 24b1, 24c1, 24d1 of the return passage 24b and the both deviating passages 24c and 24d are formed on the revolving component group 18. This wall portions 24b1, 24c1, 24d1 surround the roll bodies 22 over a greater part of their periphery, so that the revolving component group 18 acts as a basket or a shell, from which the roll bodies 22 can not fall out. Since the trough-shaped element 26 formed as a part of the revolving component group 18 laterally surrounds the roll bodies 22, the revolving component group 18 includes further a holding bracket 28 which prevents the lateral falling out of the roll bodies 22 from the running passage 24. The roll bodies 22 are therefore reliably held on the revolving component groups 18.

The trough-shaped element 26 is composed for example of steel, so that it can withstand without problems the loads acting on its load-supporting wall 26a. In the condition assembled with the base unit 16, the wall-shaped element 26 is supported with its rear side 26b directly against the base unit 16 as shown in FIG. 2. In this way the receiving forces can be transferred directly to the base unit 16.

The base unit 16 is composed conventionally of light metal, for example aluminum, in particular an aluminum-extruded profile. The trough-shaped element 26 is for example connected by locking with the main body 18a of the revolving component group 18 formed for example as a synthetic plastic injection molded part. Moreover, the holding bracket 28 which can be composed of a suitable synthetic plastic over metal is connected with the main body 18a of the revolving component group 18 by arresting.

Figure 4:
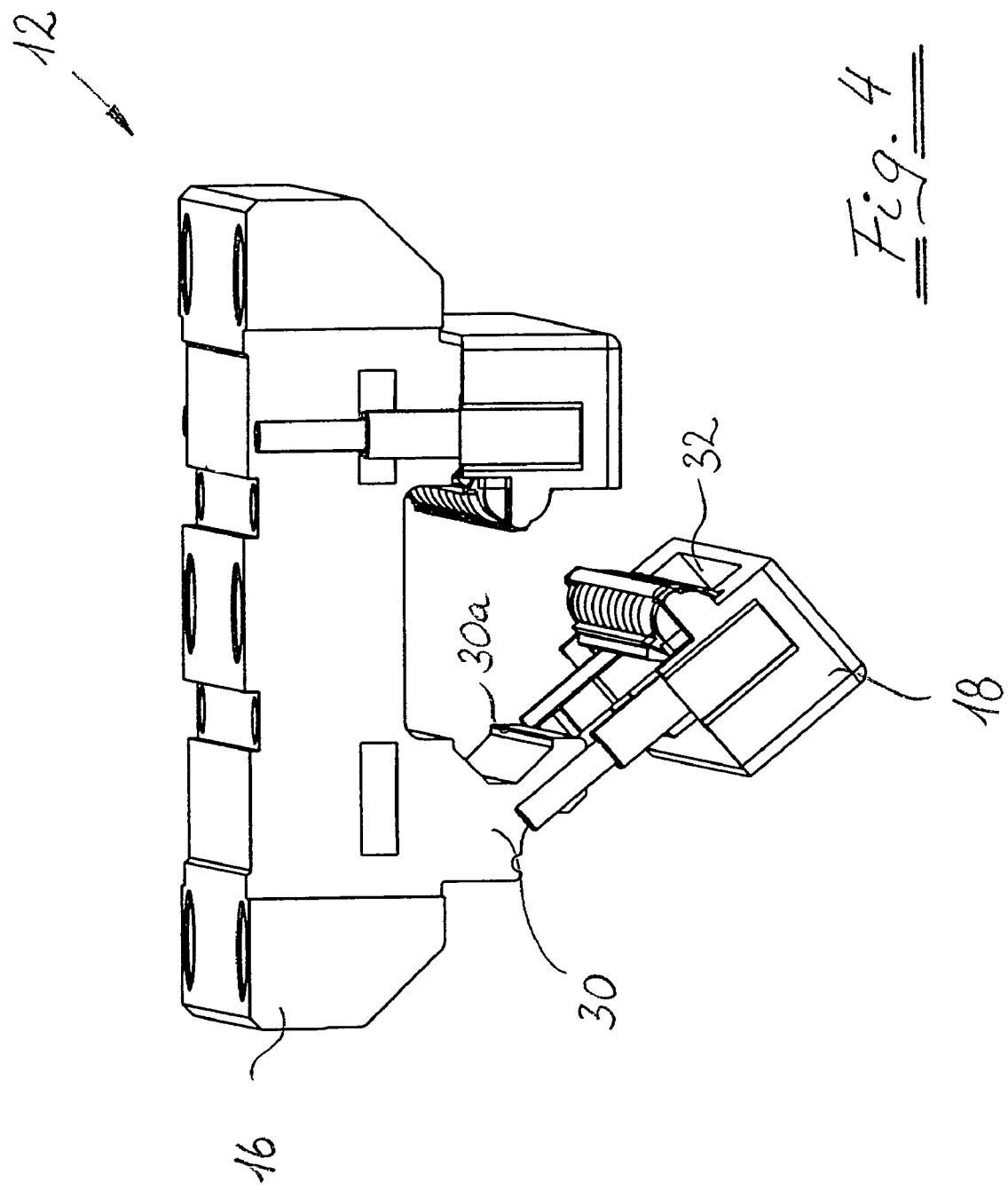
FIG. 4 is a view illustrating the assembly of the base unit and the revolving component groups of the guide carriage of FIG. 1 in accordance with the present invention.

As can be seen in particular from FIGS. 2 and 4, the revolving component group 18 can be connected by a simple locking with the base unit 16 of the running carriage 12. The base unit 16 is provided for this purpose with a downwardly extending projection 30 which is insertable into a recess 32 of the revolving component group 18 with its inclinedly inwardly angled end 30b. The projection 30 at its free end 30b is provided with an arresting formation 30a, which in the assembled condition of the base unit and the revolving component group 16, engages with a lower limiting edge of the trough-shaped element 26.

In accordance with FIG. 4, the revolving component group 18 must be guided with its recess 32 only inclinedly from below on the projection 30 of the base unit 16, and after engagement of the projection 13 to turn in the recess 32 until the arresting formations 30a engages the trough-shaped element 26. As can be seen from FIG. 2, the wall 24b1 of the return passage 24b is pulled up so much, that also during the inclined position of the revolving component group 18 a falling out of the roller bodies 22 from the revolving passage 24 is reliably prevented.

Figure 5:
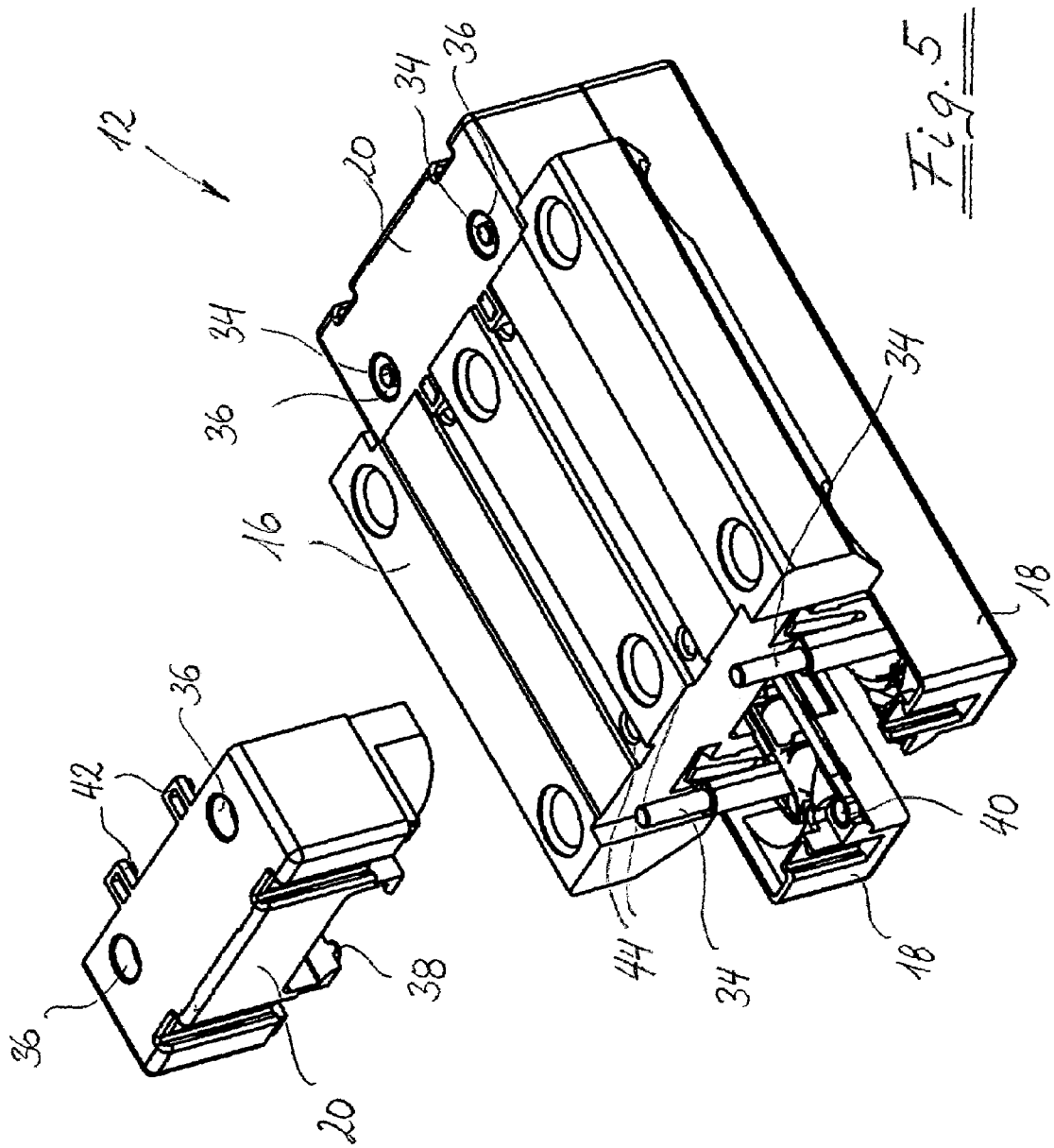
FIG. 5 is a perspective explosion view illustrating the mounting of the end cap units on the guide carriage of FIG. 1 in accordance with the present invention.

For completing the guide carriage 20 it is now necessary only to assemble the end cap units 20. These end cap units 20 are mounted in three ways on the basic unit 16 and the revolving component group 18 as shown in FIG. 5.

First, a mounting mandrel 34 extends from the revolving component group 18 and is inserted in an associated recess 36 of the end cap units 20. The end cap units 20 can be non releasably connected with the revolving component groups 18 by thermal deformation of the free end of the mandrel 34.

Secondly, the end cap units 20 engage with formations 38 in a form-locking manner in depressions 40 of the revolving component groups 18. Thereby a lateral relative elongation of the revolving component group 18 and the end cap unit 20 is prevented.

Thirdly, arresting formations 42 are formed on the end cap units 20. They can engage in the associated arresting openings 44 on the base unit 16.

In accordance with the above, the guide carriage 20 can be mounted without using a single screw as an additional part and pulling on. This significantly simplifies the mounting of the inventive guide carriage 12 and thereby the total linear guide device 10.

Figure 6A:
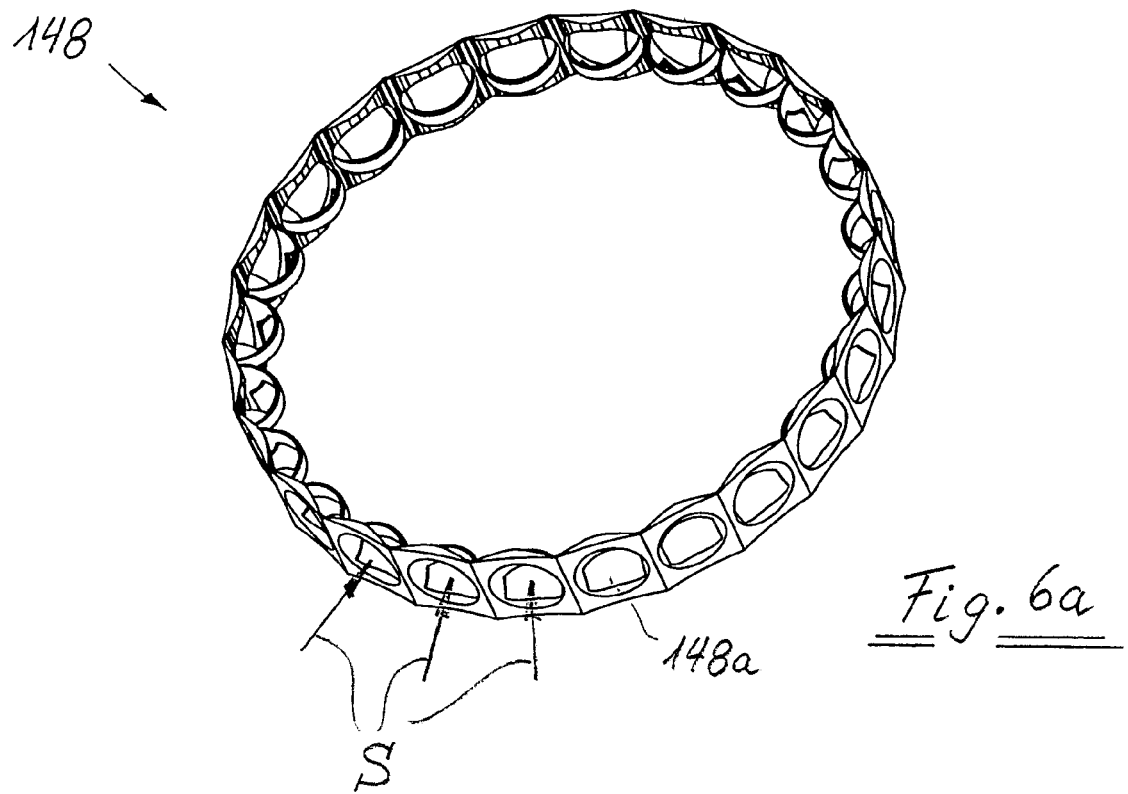
FIGS. 6a and 6b are views showing ball chain bodies which are used with the guide carriage of FIG. 1, in a manufacturing position in FIG. 6a and in a use position in FIG. 6b.
Figure 6B:
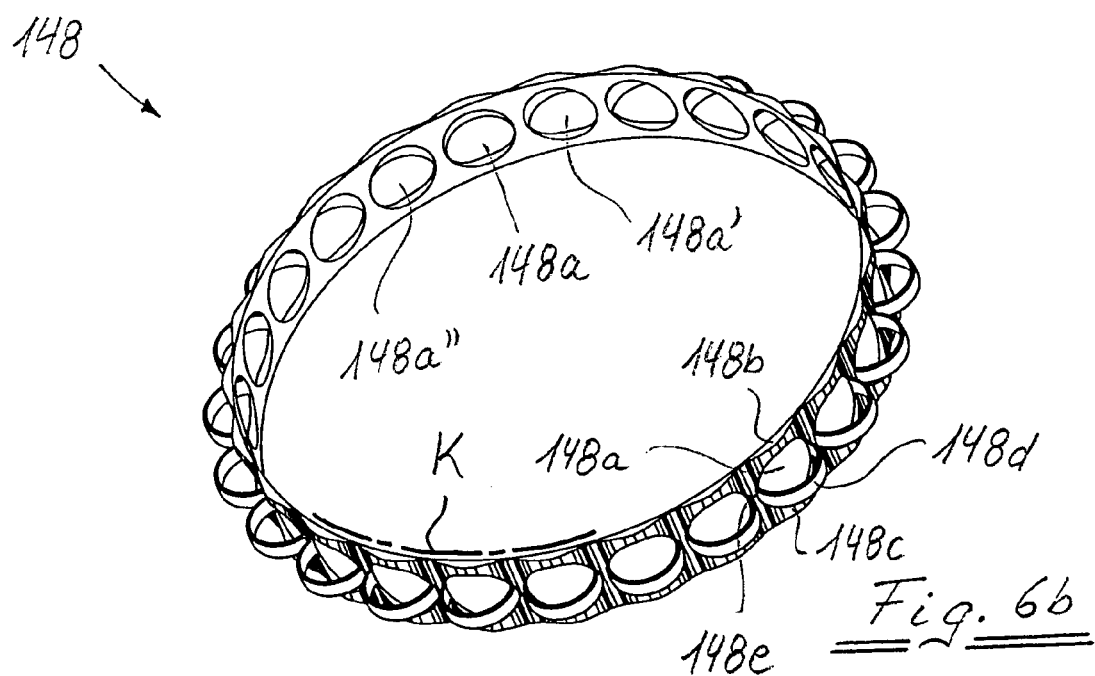

As can be seen in particular from FIGS. 2 and 3, the roll bodies 22 on the moving component group 18 are secured not only by the holding bracket 28. The roll bodies 22 are received in the roll body receptacles 48a of a roll body chain 48. One particularly advantageous embodiment 148 of such a roll body chain is shown in FIGS. 6a and 6b. With the use of this roll body chain 48, the holding bracket 28 can be dispensed with.

The main reason for this possibility is that the chain body 148 is formed as an endless chain body. In other words each roll body receptacle 148 has both a preceding neighboring receptacle 148a' and also a subsequent neighboring receptacle 148a". With an open chain body, for example the chain body with two end wall body receptacles which are available only through a single neighboring receptacle, the roll body chain, when these open ends come in the region of the running passage 24a, can be released from the roll body channel 24 and released from the revolving unit 18. With the endless construction of the chain body 140a this is exactly prevented.

Moreover, the individual roll body receptacles 148 are limited not only by an upper holding web 148b or a lower holding web 148c, but moreover by an outer holding web 148d. The term "outer" is used to identify that this outer holding web 148d, when the roller body receptacle 148 is located in the region of the running passage 24a, is located on the side of the roll body 22 received in the receptacle 148a which side faces away from the trough-shaped element 26. The holding web 148b prevents an accidental falling out of the roll bodies 22 from the receptacles 148a in the region of the running passage 24a.

It should be finally mentioned that the free ends of the holding webs 148b and 148c are connected with one another by connecting webs 148e which can be associated with two neighboring roll body receptacles 148a.

It should be further stated that the holding webs 148b and 148c in the region of their longitudinal center are thickened and then narrowed to the connecting webs 148e, in a direction which extends both orthogonally to the chain line K of the chain body 148 and to the longitudinal extension direction of the connecting web 148e. In this way the connecting webs are formed relatively thin. Thereby on the one hand the flexibility of the chain body 148 is increased which is advantageous for deformation of the chain body 148, in particular in the region of the deviating passages 24c and 24d. On the other hand, the thickenings of the holding webs 148b and 148c lead to a reliable hold of the roll bodies 22 in the receptacles 148a.

In reference to FIG. 6a it should be finally mentioned that the chain body 148 can be produced in an especially advantageous manner. The chain bodies 148 is manufactured in a position turned by 180° with respect to the chain line K. It is produced for example as a synthetic plastic injection molded part and turned after the removal from the mold to the use position shown in FIG. 6b. This inverted manufacturing position has the advantage that the form plunger identified with the arrow S in FIG. 6a can be guided radially outwardly for formation of the roll body receptacles 148a, or in other words at a location, where sufficient space for its arrangement is available.

It will be understood that each of the elements described above, or two or more together, may also find a useful application in other types of methods and constructions differing from the types described above.

While the invention has been illustrated and described as embodied in a linear guide device, chain body, and method of producing a chain body, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A linear guide device, comprising a guide rail extending in a guiding direction; a guide carriage guided on said guide rail by means of at least one roll body revolving means in said guiding direction, said at least one roll body revolving means including a revolving passage and a plurality of roll bodies which revolve in said revolving passage, said revolving passage including a running passage which is limited by a roll body running path formed on said guide rail and by a load-receiving wall portion of said guide carriage, a return passage, and two deviating passages which connect said running passage with said return passage and in which the roll bodies are substantially load free, said guide carriage having a base unit and at least one revolving component group, said revolving component group having at least one lower wall portion of a wall which limits said return passage and at least one lower wall portion of a wall which limits said deviating passages, said revolving component group also having a load-receiving wall portion of said running passage; and holding means which hold roll bodies arranged in a region of said running passage also on said guide carriage at a state of said guide carriage spaced from said guide rail, wherein only an upper wall portion of the wall portions limiting at least one of the deviating passages is formed in an end cap unit which is arranged in a longitudinal direction before or after said base unit of said guide carriage, wherein said revolving component group has at least one projecting pin with a deformable free end on which said end cap unit is fittable, wherein said end cap unit has at least one arresting element arrestable with an associated arresting counter element provided in an element selected from the group consisting of said base unit and said revolving component group.

2. Linear guide device as defined in claim 1, wherein said load-receiving wall portion of said running passage surrounds the roll bodies at most over half of a periphery of said roll bodies.

3. Linear guide device as defined in claim 1, wherein said holding means is formed by an elongated holding bracket with two longitudinal ends arranged on said revolving component group in a region of ends of said running passage.

4. Linear guide device as defined in claim 3, wherein said holding means is formed of one piece with said longitudinal ends of said revolving component group in the region of said ends of said running passage.

5. Linear guide device as defined in claim 1, wherein said longitudinal ends of said holding means are mounted on said revolving component group in the region of said ends of said running passage.

6. Linear guide device as defined in claim 1, wherein said holding means is formed by a flexible roll body chain.

7. Linear guide device as defined in claim 6, wherein said flexible roll body chain is a closed chain.

8. Linear guide device as defined in claim 1, wherein said revolving component group is composed at least partially of synthetic plastic.

9. Linear guide device as defined in claim 8, wherein said revolving component group is formed as an injection molded revolving component group.

10. Linear guide device as defined in claim 1, wherein said revolving component group has a steel element provided with a running trough, said load-receiving wall portion of said running passage is provided on said steel element.

11. Linear guide device as defined in claim 10, wherein said steel element in a condition of said revolving component group assembled with said base unit is supported on said base unit.

12. Linear guide device as defined in claim 11, wherein said steel element is directly supported on said base unit in said assembled condition of said revolving component group.

13. Linear guide device as defined in claim 1, wherein said base unit is provided with at least one projection which is insertable in an associated opening of said revolving component group.

14. Linear guide device as defined in claim 13, wherein a receptacle is formed between a wall portion which limits said return passage and a part of said revolving component group which is provided with said load-receiving wall portion.

15. Linear guide device as defined in claim 14, wherein said part of said revolving component group is formed as a steel element.

16. Linear guide device as defined in claim 13, wherein said at least one projection is provided with at least one arresting formation.

17. Linear guide device as defined in claim 1, wherein said end cap unit is composed of at least partially of synthetic plastic.

18. Linear guide device as defined in claim 1, wherein said end cap unit is formed as an injection molded end cap unit.

19. Linear guide device as defined in claim 1, wherein said arresting element is formed as an arresting projection, while said arresting counter element is formed as an arresting recess.

20. Linear guide device as defined in claim 1, wherein said base unit is composed of light metal.

21. Linear guide device as defined in claim 20, wherein said base unit is composed of aluminum.

22. Linear guide device as defined in claim 1, wherein said base unit is composed of a cut extruded profile.

\* \* \* \* \*